United States Patent [19]
Yuuki et al.

[11] Patent Number: 5,271,906
[45] Date of Patent: Dec. 21, 1993

[54] EXHAUST EMISSION CONTROL APPARATUS USING CATALYTIC CONVERTER WITH HYDROCARBON ABSORBENT

[75] Inventors: Kiyoshi Yuuki; Hiroshi Hirayama, both of Susono; Takehisa Yaegashi, Mishima, all of Japan

[73] Assignee: Toyota Jidosha Kabushiki Kaisha, Toyota, Japan

[21] Appl. No.: 966,927

[22] Filed: Oct. 27, 1992

[30] Foreign Application Priority Data

Oct. 28, 1991 [JP] Japan ................. 3-281671
Nov. 1, 1991 [JP] Japan ................. 3-287983
Aug. 11, 1992 [JP] Japan ................. 4-214382

[51] Int. Cl.⁵ ............................. B01D 53/34
[52] U.S. Cl. ........................... 422/177; 422/173; 422/174; 422/171; 60/297; 60/300; 60/286; 55/DIG. 30
[58] Field of Search ............... 422/174, 173, 171, 177, 422/180, 109; 55/DIG. 30, 523; 60/297, 300, 286

[56] References Cited

U.S. PATENT DOCUMENTS

| | | | |
|---|---|---|---|
| 3,273,971 | 9/1966 | Baddorf et al. | 422/115 |
| 3,297,400 | 1/1967 | Eastwood | 423/213.2 |
| 3,657,892 | 4/1972 | Perga et al. | 60/274 |
| 3,768,982 | 10/1973 | Kitzner et al. | 422/174 |
| 3,791,143 | 2/1974 | Keith et al. | 60/274 |
| 3,813,226 | 5/1974 | Heitland et al. | 422/171 |
| 3,892,536 | 7/1975 | Roeser et al. | 422/169 |
| 3,896,616 | 7/1975 | Keith et al. | 422/171 |
| 4,118,199 | 10/1978 | Völker et al. | 422/171 |
| 4,556,543 | 12/1985 | Mochida et al. | 422/171 |
| 4,817,385 | 4/1989 | Kumagai | 422/171 |
| 4,875,336 | 10/1989 | Hayashi et al. | 60/286 |
| 4,928,485 | 5/1990 | Whittenberger | 60/299 |
| 4,976,929 | 12/1990 | Cornelison et al. | 422/174 |
| 4,985,210 | 1/1991 | Minami | 422/169 |
| 5,070,694 | 12/1991 | Whittenberger | 422/174 |

FOREIGN PATENT DOCUMENTS

| | | |
|---|---|---|
| 2257968 | 5/1974 | Fed. Rep. of Germany . |
| 2-135126 | 5/1990 | Japan . |
| 2-173312 | 7/1990 | Japan . |
| 290315 | 7/1990 | Japan . |

Primary Examiner—Robert J. Warden
Assistant Examiner—Hien Tran
Attorney, Agent, or Firm—Kenyon & Kenyon

[57] ABSTRACT

An exhaust emission control apparatus includes an absorbent provided in an upstream portion of an exhaust passage of an engine to absorb hydrocarbon in exhaust gas passed through the exhaust passage at a temperature lower than a predetermined first temperature, the hydrocarbon being desorbed from the absorbent at a temperature higher than the first temperature, a catalytic converter provided in a downstream portion of the exhaust passage to purify hydrocarbon in the exhaust gas when a catalyst of the catalytic converter is active, the catalyst of the catalytic converter being activated at a temperature higher than a predetermined second temperature, the second temperature being higher than the first temperature, and a heating part for heating the catalytic converter to a temperature higher than the second temperature when the engine is in a prescribed starting condition and the absorbent is at a temperature higher than the first temperature, so that the hydrocarbon desorbed from the absorbent in the exhaust passage is purified by the activated catalyst of the catalytic converter.

8 Claims, 12 Drawing Sheets

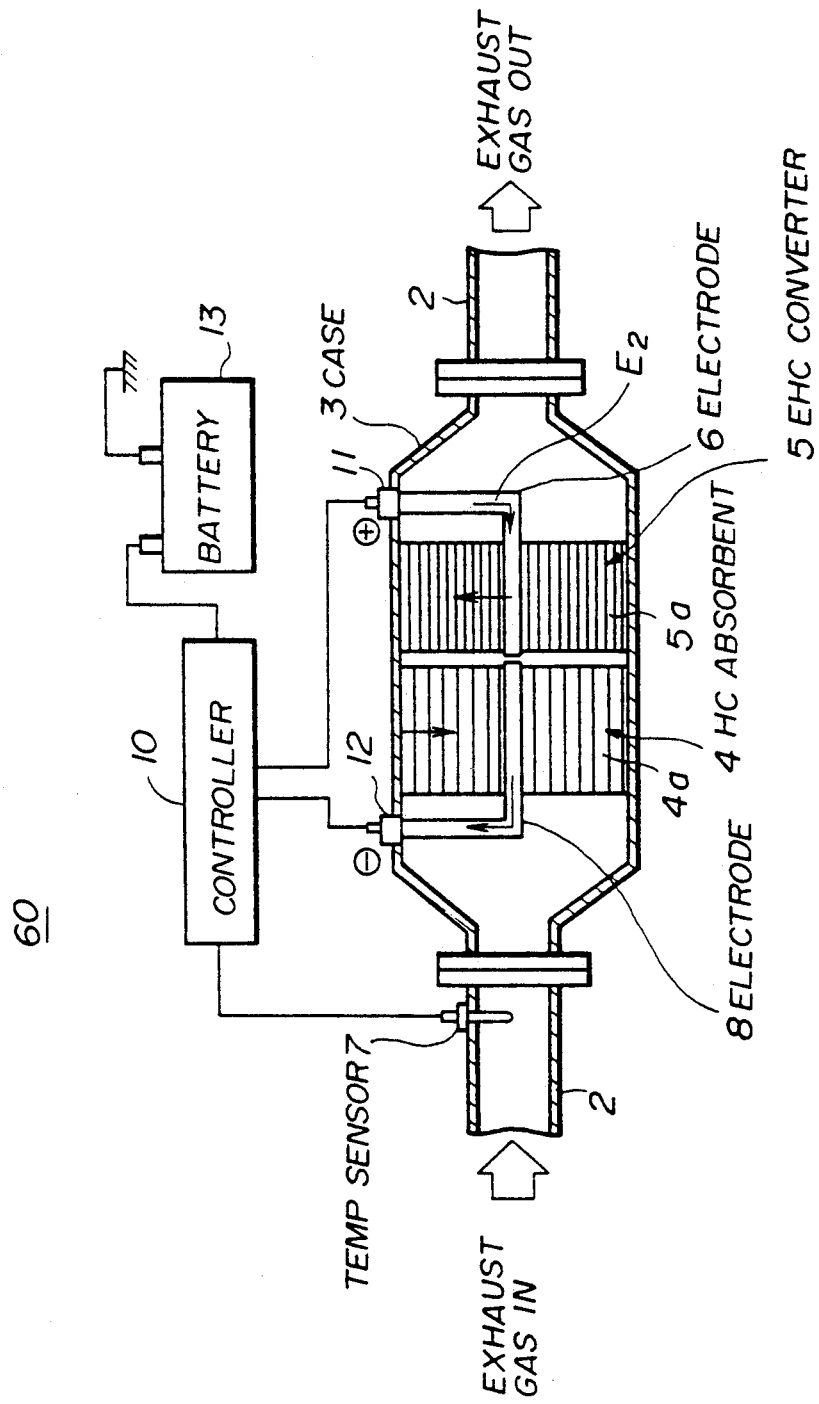

EXHAUST EMISSION CONTROL APPARATUS USING CATALYTIC CONVERTER WITH HYDROCARBON ABSORBENT

BACKGROUND OF THE INVENTION

(1) Field of the Invention

The present invention generally relates to an exhaust emission control apparatus, and more particularly to an exhaust emission control apparatus in which an absorbent for absorbing hydrocarbon and a catalytic converter for purifying exhaust gas are provided in an exhaust passage.

(2) Description of the Related Art

In order to purify exhaust gas in an exhaust passage of an internal combustion engine of an automobile vehicle, a pellet catalyst or a monolithic catalyst is conventionally used in an exhaust system of the engine. Hydrocarbon HC is one of the harmful components (HC, CO, NOx) in the exhaust gas, and purification of hydrocarbon HC performed by means of a catalytic converter is strongly dependent on the exhaust gas temperature. Even when a precious metal catalyst is used to purify the exhaust gas, the exhaust gas temperature must be higher than 250 deg C to efficiently purify hydrocarbon HC in the exhaust gas.

Therefore, it is difficult to purify hydrocarbon HC in exhaust gas by means of a catalytic converter especially when the exhaust gas is at a relatively low temperature just after the engine has started to operate. Moreover, just after the engine has started to operate, a large amount of hydrocarbon HC is emitted from the engine (which is hereinafter called cold HC), and the amount of this cold HC relative to a total of the exhaust gas is large. Thus, it is necessary to control the emission of cold HC in exhaust gas when the exhaust gas is at a low temperature just after the engine has started to operate, in order to improve the performance of the engine.

To eliminate the above described problem, a certain type of exhaust emission control apparatus has been proposed. This apparatus absorbs hydrocarbon HC in exhaust gas using a HC absorbent trapper when the exhaust gas temperature is low, whereas, when the exhaust gas temperature is high, the harmful components of exhaust gas as well as the cold HC desorbed from the HC absorbent are purified by means of a catalytic converter. Japanese Laid-Open Patent Publication No. 2-173312 discloses a typical exhaust emission control device of the type mentioned above. In the exhaust emission control device disclosed in the above mentioned publication, an HC absorbent trapper for absorbing the cold HC and a catalytic converter for purifying the exhaust gas are provided in the exhaust system of the engine.

However, in the exhaust emission control device mentioned above, the HC absorbent trapper is placed in a by-pass passage, and the catalytic converter is placed in an intermediate portion of an exhaust passage. The by-pass passage is arranged so as to branch from the exhaust passage at an upstream portion of the converter and it is connected to the exhaust passage at a downstream portion of the converter. A switching valve is arranged within the exhaust passage in the branch portion of the by-pass passage, so that exhaust gas from the engine can be fed into either the exhaust passage or the by-pass passage. That is, the switching valve is switched on and off in a manner such that when the exhaust gas is at a relatively low temperature (below a catalyst activation temperature) the exhaust gas is fed into the by-pass passage in which the HC absorbent trapper is placed, whereas, when the exhaust gas is at a high temperature (above the catalyst activation temperature), the exhaust gas is fed into the exhaust passage via the switching valve.

However, in the above described conventional device, no consideration is given to the fact that the HC absorbent and the catalytic converter have different temperature characteristics. Generally speaking, at a temperature lower than the desorption temperature (which lies in a range between 100 deg C. and 200 deg C.), the HC absorbent trapper efficiently absorbs hydrocarbon HC in exhaust gas, whereas the absorbed HC is desorbed from the HC absorbent at a temperature higher than the desorption temperature. The activation temperature of a catalytic converter (at which the catalyst of the catalytic converter is activated) is around 250 deg C. when in an initial condition, and the activation temperature thereof changes to a higher temperature after the catalytic converter has been used for a long period of time. The HC absorbent temperature and the catalytic converter temperature in the above mentioned exhaust emission control device increase at the same time due to the heat of the exhaust gas. Thus, the rate of increase of the temperature of the HC absorbent at the upstream portion of the exhaust passage relative to the flow of the exhaust gas is greater than the rate of increase of the temperature of the catalytic converter at the downstream portion thereof.

As described above, in the above conventional device, no consideration is given to the difference between the temperature characteristics of the HC absorbent and the catalytic converter. More specifically, even when the HC absorbent temperature is higher than the desorption temperature (around 200 deg C.) and the absorbed HC is gradually desorbed from the HC absorbent, the catalytic converter temperature is still lower than the activation temperature (around 250 deg C.). The hydrocarbon desorbed from the HC absorbent cannot be purified by the inactive catalyst of the catalytic converter at such a temperature, and thus there is a problem in that the desorbed hydrocarbon is emitted to the atmosphere in an unpurified state.

Moreover, the exhaust passage in which the exhaust emission control device is provided is often subjected to vibrations due to the operating of the engine and the vehicle running on a rough road. Thus, the above conventional exhaust emission control device is strongly influenced by such subjecting of the exhaust passage to vibrations as well as by the exhaust back pressure changes, and thus it is difficult to correctly control the operations of the switching valve for selectively feeding the exhaust gas into the exhaust passage or the by-pass passage. In addition, there is a problem in that a certain amount of hydrocarbon HC may leak from around the switching valve, and thus the HC is emitted to the atmosphere in an unpurified state. Also, there is a problem in that use of the by-pass passage makes the conventional device somewhat bulky and complicated.

SUMMARY OF THE INVENTION

Accordingly, it is a general object of the present invention to provide an improved exhaust emission control apparatus in which the above described problems are eliminated.

Another and more specific object of the present invention is to provide an exhaust emission control apparatus in which the difference between the temperature characteristics of the HC absorbent and the catalytic converter is eliminated so that the hydrocarbon in the exhaust gas can be efficiently and safely purified so as to prevent the hydrocarbon from being emitted to the atmosphere in an unpurified state. The above mentioned object of the present invention is achieved by an exhaust emission control apparatus which includes an absorbent provided in an upstream portion of an exhaust passage of an engine to absorb hydrocarbon in exhaust gas being passed through the exhaust passage at a temperature lower than a predetermined first temperature, the hydrocarbon being desorbed from the absorbent at a temperature higher than the predetermined first temperature, a catalytic converter provided in a downstream portion of the exhaust passage to purify hydrocarbon in the exhaust gas when a catalyst of the catalytic converter is active, the catalyst of the catalytic converter being activated at a temperature higher than a predetermined second temperature, the second temperature being higher than the first temperature, and a heating part for heating the catalytic converter to a temperature higher than the second temperature when the engine is in a prescribed starting condition and the absorbent is at a temperature higher than the first temperature, so that the hydrocarbon being desorbed from the absorbent at a temperature higher than the first temperature is purified by the active catalyst of the catalytic converter. According to the exhaust emission control apparatus of the present invention, it is possible to efficiently and reliably prevent the hydrocarbon (which is desorbed from the HC absorbent whose temperature is higher than the desorption temperature) from being emitted to the atmosphere in an unpurified state. The desorbed hydrocarbon at such a temperature is purified by an active catalyst of the catalytic converter because an electric current is supplied to an electrically heated metallic support when the HC absorbent reaches the desorption temperature.

Other objects and further features of the present invention will become apparent from the following detailed description when read in conjunction with the accompanying drawings.

BRIEF DESCRIPTION OF THE DRAWINGS

FIG. 11 is a diagram showing another modification of the exhaust emission control apparatus shown in FIG. 8.

DESCRIPTION OF THE PREFERRED EMBODIMENTS

Figure 1:
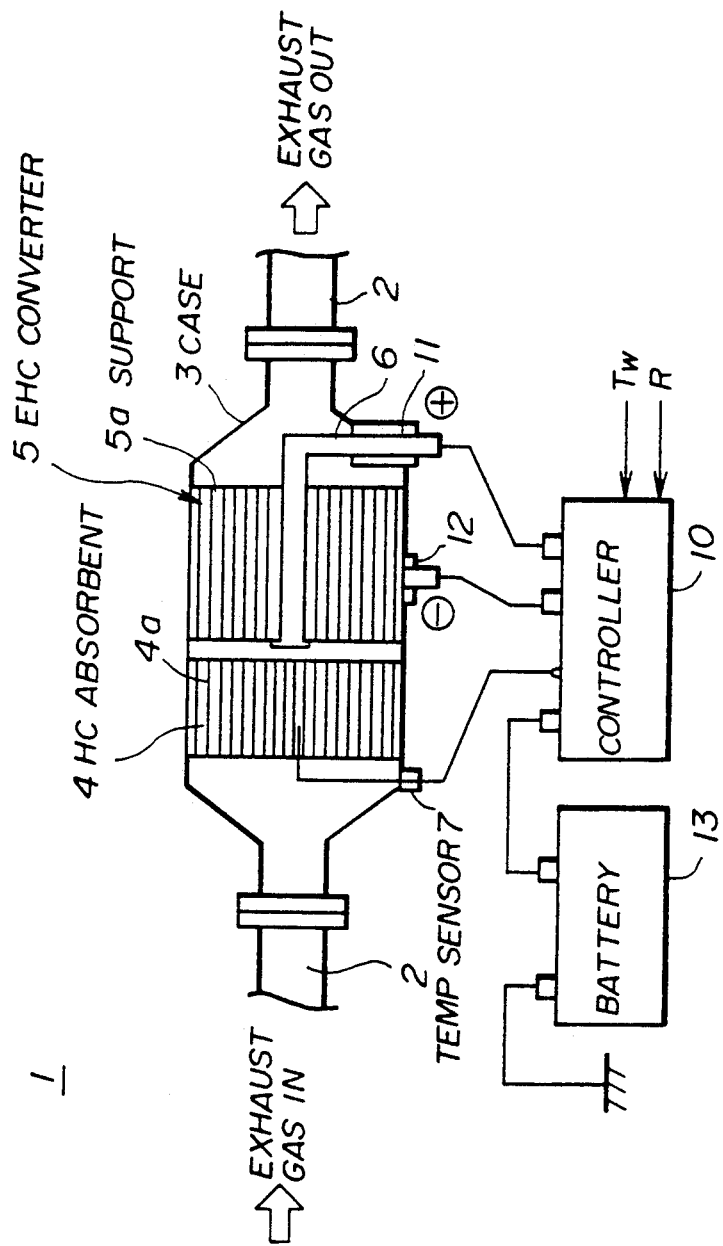
FIG. 1 is a diagram showing a first embodiment of an exhaust emission control apparatus according to the present invention.

A description will now be given of a first embodiment of an exhaust emission control apparatus according to the present invention, with reference to FIG. 1. The exhaust emission control apparatus is generally designated by reference numeral 1. Exhaust gas sent from an engine (not shown in FIG. 1) is passed through an exhaust passage 2 in a direction indicated by an arrow shown in FIG. 1, and the exhaust gas is emitted to the atmosphere at an exhaust pipe outlet. The exhaust emission control apparatus 1 of the present invention is arranged in an intermediate portion of the exhaust passage 2. Since the exhaust gas in the exhaust passage 2 flows in the indicated direction, a left-hand portion of the drawing is called herein an upstream portion, and a right-hand portion thereof is called a downstream portion.

The exhaust emission control apparatus 1 comprises a converter case 3, an HC absorbent 4, an electrically heated catalytic converter 5 (abbreviated hereinafter to an EHC converter), a temperature sensor 7, and a controller 10. At an upstream portion of the converter case 3 the HC absorbent 4 is provided in order to absorb hydrocarbon HC included in the exhaust gas, and at a downstream portion of the case 3 the EHC converter 5 is provided in order to convert the absorbed hydrocarbon of the HC absorbent 4 into carbon dioxide $CO_2$ and water $H_2O$. This conversion process is called hereinafter the purification of hydrocarbon. The HC absorbent 4 and the EHC converter 5 are connected in series in the converter case 3. The exhaust emission control apparatus is thus constructed so as to be a compact unit in which the HC absorbent 4 and the EHC converter 5 are accommodated.

The HC absorbent 4 of the exhaust emission control apparatus 1 is formed from an electrically heatable metallic support 4a with a honeycomb structure, and this metallic support 4a uses a ferritic stainless steel foil having a high-temperature corrosion resistance. The metallic support 4a of the HC absorbent 4 is coated with a porous absorbing material such as zeolite, silica, alumina or the like which is suitable as the hydrocarbon absorbing substance. In the vicinity of the HC absorbent 4 of the converter case 3, the temperature sensor 7 is provided to detect a temperature Ta of the HC absorbent 4, and a signal indicative of a measured HC absorbent temperature is output by the temperature sensor 7 to the controller 10.

The HC absorbent 4 having the hydrocarbon absorbing substance generally serves to absorb the hydrocarbon and reduce the amount of the hydrocarbon in the exhaust gas passed through the exhaust passage 2 when the HC absorbent temperature is lower than a prescribed desorption temperature (a temperature ranging between around 100 deg C. and 200 deg C.). Conversely, when the HC absorbent temperature is higher than the prescribed desorption temperature mentioned above, the hydrocarbon is desorbed from the hydrocarbon absorbing substance of the HC absorbent 4.

The EHC converter 5 is made from an electrically heatable metallic support 5a having a honeycomb structure. This metallic support 5a is formed by winding a ferritic stainless steel foil (with a high-temperature corrosion resistance) on a core electrode. The metallic support 5a is coated with alumina, and catalyst substances such as platinum Pt, palladium Pd, and rhodium Rh are fixed on the alumina-coated metallic support 5a. The catalyst activation temperature of the EHC converter 5 is usually around 250 deg C. When the temperature of the EHC converter 5 is below the activation temperature mentioned above, the EHC converter 5 does not effectively convert hydrocarbon into carbon dioxide and water, and the amount of the hydrocarbon in the exhaust gas is not reduced, with the result that the hydrocarbon of the exhaust gas is emitted to the atmosphere in an unpurified state. On the other hand, when the EHC converter temperature exceeds the activation temperature, the EHC converter 5 effectively purifies the harmful components of the exhaust gas passed through the exhaust passage.

An L-shaped positive electrode 11 is connected at one end to a central portion of the EHC converter 5. The positive electrode 11 extends from the central portion of the EHC converter 5, so that the other end of the electrode 11 is located outside the converter case 3 at a downstream portion of the EHC converter 5. This end portion of the electrode 11 is connected to the controller 10 via a lead wire. A negative electrode 12, coupled to the controller 10, is connected to the metallic support 5a of the EHC converter 5. Thus, the metallic support 5a is electrically heated when the controller 10 supplies electric current of a battery 13, coupled to the controller 10, to the positive and negative electrodes 11 and 12, respectively, and to the core electrode 6 of the EHC converter 5 so that the temperature of the EHC converter 5 is increased by the heat of the metallic support 5a.

A signal indicating the HC absorbent temperature Ta output by the temperature sensor 7, a water temperature signal indicating an engine cooling water temperature Tw output by a water temperature sensor (not shown) mounted on the engine, and an engine speed signal indicating an engine rotating speed R output by a distributor (not shown) are supplied to the controller 10. The battery 13 coupled to the controller 10 is a power source which generates electric power required to drive the controller 10 and generates electric power required to heat the EHC converter 5 via the controller 10. In accordance with the output signals of the sensors mentioned above, the controller 10 performs an EHC converter heating process according to the present invention, which will be described below in detail.

Figure 2:
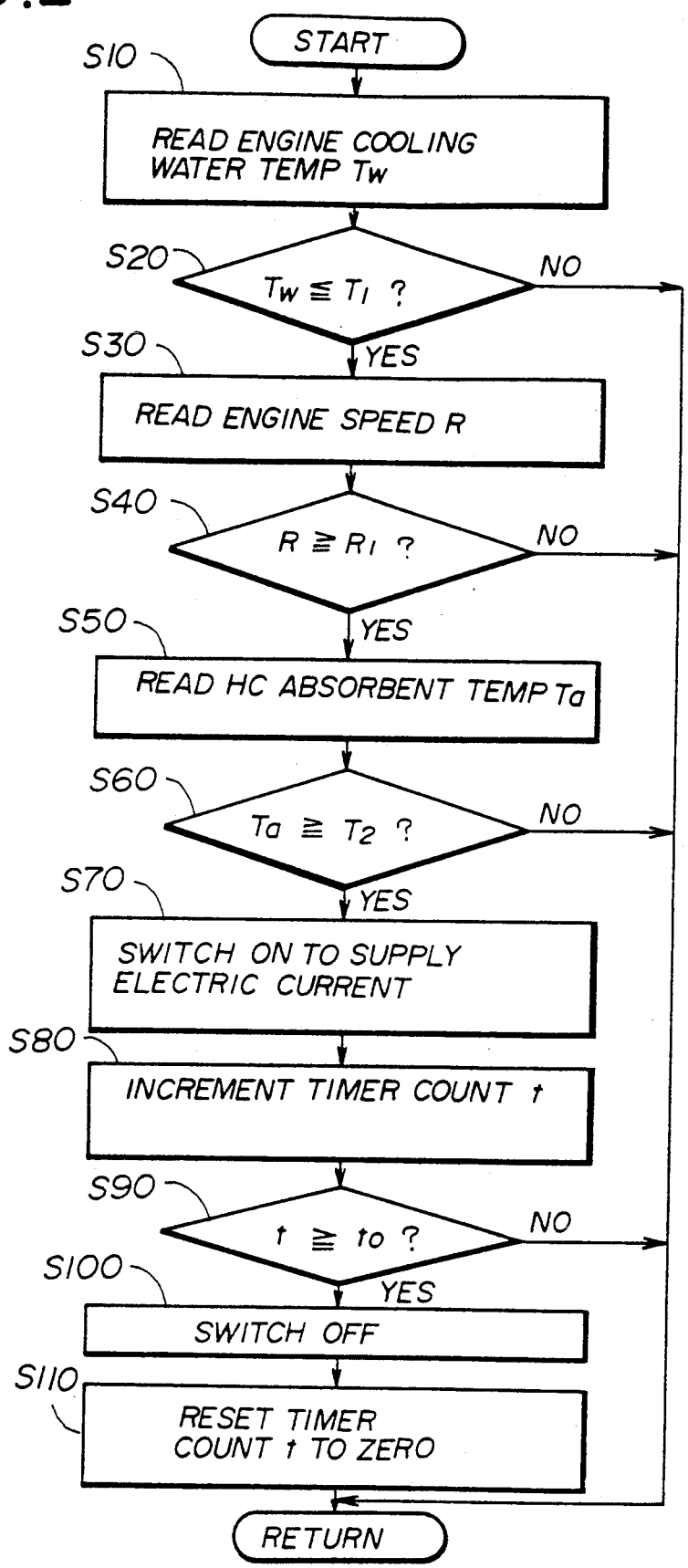
FIG. 2 is a flow chart for explaining an EHC converter heating process performed by the exhaust emission control apparatus shown in FIG. 1.

Next, a description will be given of the EHC converter heating process performed by the exhaust emission control apparatus of the present invention, with reference to FIG. 2. This EHC converter heating process shown in FIG. 2 is repeatedly commenced in the controller 10 of the exhaust emission control apparatus at time intervals of, for example 4 milliseconds.

When the EHC converter heating process is commenced, step S10 reads an engine cooling water temperature Tw indicated by the output signal of the water temperature sensor on the engine, by means of the controller 10. Step S20 detects whether or not the engine cooling water temperature Tw read in step S10 is lower than a predetermined temperature T1. If it is detected that the temperature Tw is lower than the temperature T1 (Tw≦T1), step S30 reads an engine rotating speed R (or, the number of revolutions per second) indicated by the output signal of the distributor. Step S40 detects whether or not the engine rotating speed R is higher than a predetermined value R1.

In the above mentioned steps S10 through S40, it is determined whether or not the engine is still in a starting condition. When the engine is in a starting condition, it is necessary to absorb hydrocarbon in exhaust gas by means of the HC absorbent 4 since the catalyst of the EHC converter 5 is not yet active. Conversely, when the engine is not in a starting condition but instead in a stable running condition, the engine cooling water temperature is higher than the temperature T1, the engine speed is lower than the value R1, and thus the catalyst of the EHC converter 5 becomes active. In such a case, the EHC converter heating process immediately ends without performing the steps S50 through S110.

If it is determined in steps S20 and S40 that the engine is in the starting condition (Tw≦T1 and R≧R1), step S50 reads an HC absorbent temperature Ta indicated by the temperature sensor 7. Step S60 detects whether or not the HC absorbent temperature Ta is higher than a predetermined temperature T2. The temperature T2 is preset to an appropriate temperature (for example, 150°±30° deg C.) which is lower than the desorption temperature (200 deg C.) of the HC absorbent 4. According to the exhaust emission control apparatus of the present invention, as soon as the HC absorbent temperature Ta reaches the predetermined temperature T2, the controller 10 starts supplying electric current to the EHC converter 5 so as to heat the catalyst of the EHC converter 5.

If step S60 detects that the temperature Ta is higher than the predetermined temperature T2, step S70 switches on a terminal of the controller 10 to start supplying electric current to the metallic support 5a of the EHC converter 5. By controlling the electric current supplied to the metallic support 5a by means of the controller 10, the catalyst of the EHC converter 5 is quickly heated by the metallic support 5a. Since the engine is in the starting condition, an increased amount of exhaust gas is passed through the exhaust passage, and therefore the HC absorbent temperature and the EHC converter temperature are increased at the same time due to the heat of the exhaust gas in the exhaust passage. According to the exhaust emission control apparatus of the present invention, it is possible to make the rate at which the EHC converter temperature is increased greater than the rate at which the HC absorbent temperature is increased by means of the above described function of the controller 10.

Immediately after supplying electric current to increments the number of output pulses of an on-time timer, the number of the output pulses indicating an on-time period t during which the electric current is continuously supplied to the metallic support 5a of the EHC converter 5. Step S90 detects whether or not the on-time period t, indicated by the number of the output pulses in step S80, exceeds a predetermined time period t0 (which is preset to, for example, 10+5 seconds). The controller 10 continuously supplies the electric current to the metallic support 5a until the on-time period t exceeds the predetermined time period t0. If it is detected in step S90 that the on-time period t exceeds the predetermined time period t0, step S100 stops supplying electric current to the metallic support 5a by switching off the terminal of the controller 10. Step S110 resets the on-time period t indicated by the number of the output pulses to zero, and the EHC converter heating process ends.

Figure 3:
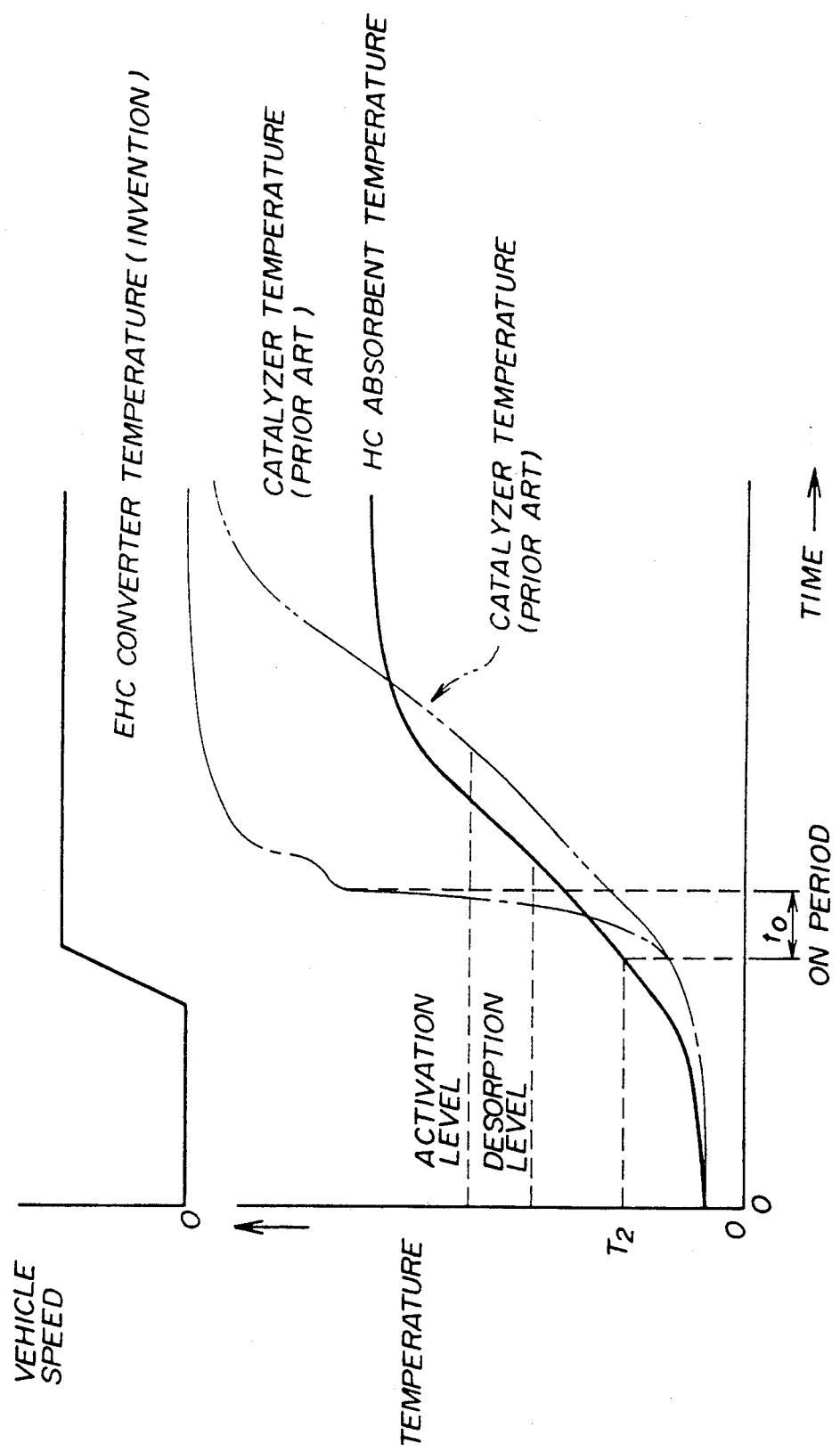
FIG. 3 is a chart for explaining temperature changes in the respective parts of the catalytic converter.

Referring next to FIG. 3, a description will be given as to how the EHC converter temperature and the HC absorbent temperature are changed as the result of the EHC converter heating process shown in FIG. 2 being performed. In the lower-half of the chart of FIG. 3, the change in the temperature Ta of the HC absorbent 4 when the EHC converter heating process is performed is indicated by a solid line, the change in the temperature Tc of the EHC converter 5 when the EHC converter heating process is performed is indicated by a one-dot chain line, and the change in the temperature of a conventional catalyzer with no heating element, corresponding to the above mentioned temperature changes, is indicated by a two-dot chain line. In the upper-half chart of the chart of FIG. 3, a change in a vehicle speed when a vehicle goes through a starting condition of its engine is indicated.

As shown in FIG. 3, in the case of the conventional catalyzer having no heating element, the temperature of the catalyzer is somewhat lower than the activation temperature when the HC absorbent reaches the desorption temperature during the starting condition of the engine. Therefore, when the conventional catalyzer is used, there is a problem in that the hydrocarbon desorbed from the HC absorbent is not purified by the catalyzer, and thus the hydrocarbon in the exhaust gas is to the atmosphere in an unpurified state.

In contrast, in the case of the present invention, the EHC converter 5 is provided with the electrically heatable metallic support 5a. During the on-time period t0, electric current is supplied to the metallic support 5a via the controller 10 so that the catalyst of the EHC converter 5 is heated due to the metallic support 5a. As shown in FIG. 3, the temperature of the metallic support 5a is quickly increased to a temperature higher than the activation temperature, and, when the HC absorbent temperature reaches the desorption temperature, the EHC converter temperature is somewhat higher than the activation temperature. Therefore, even if a certain amount of hydrocarbon is desorbed from the HC absorbent 4, such hydrocarbon can be converted by the active catalyst of the EHC converter 5, so that the minimized amount of hydrocarbon in the exhaust gas is emitted to the atmosphere in an unpurified state. Hence, according to the present invention, the efficiency of the purification of HC is increased and the amount of harmful components in exhaust gas emitted from the engine is remarkably reduced.

As described above, the temperature T2 is preset to an appropriate temperature which is lower than the desorption temperature of the HC absorbent 4. This temperature T2 is used as a criterion to determine whether or not supplying electric current to the EHC converter 5 is started. Hereinafter in the present specification, the on-time period during which the electric current is continuously supplied to the metallic support 5a of the EHC converter 5 is the time period required for increasing the temperature of the EHC converter 5 to the activation temperature. In other words, the on-time period is dependent on the value of the predetermined temperature T2. Thus, by presetting the temperature T2 to an appropriate temperature, it is possible to make the catalyst of the EHC converter 5 active by quickly heating the EHC converter 5 when the HC absorbent 4 exceeds the desorption temperature.

Figure 4:
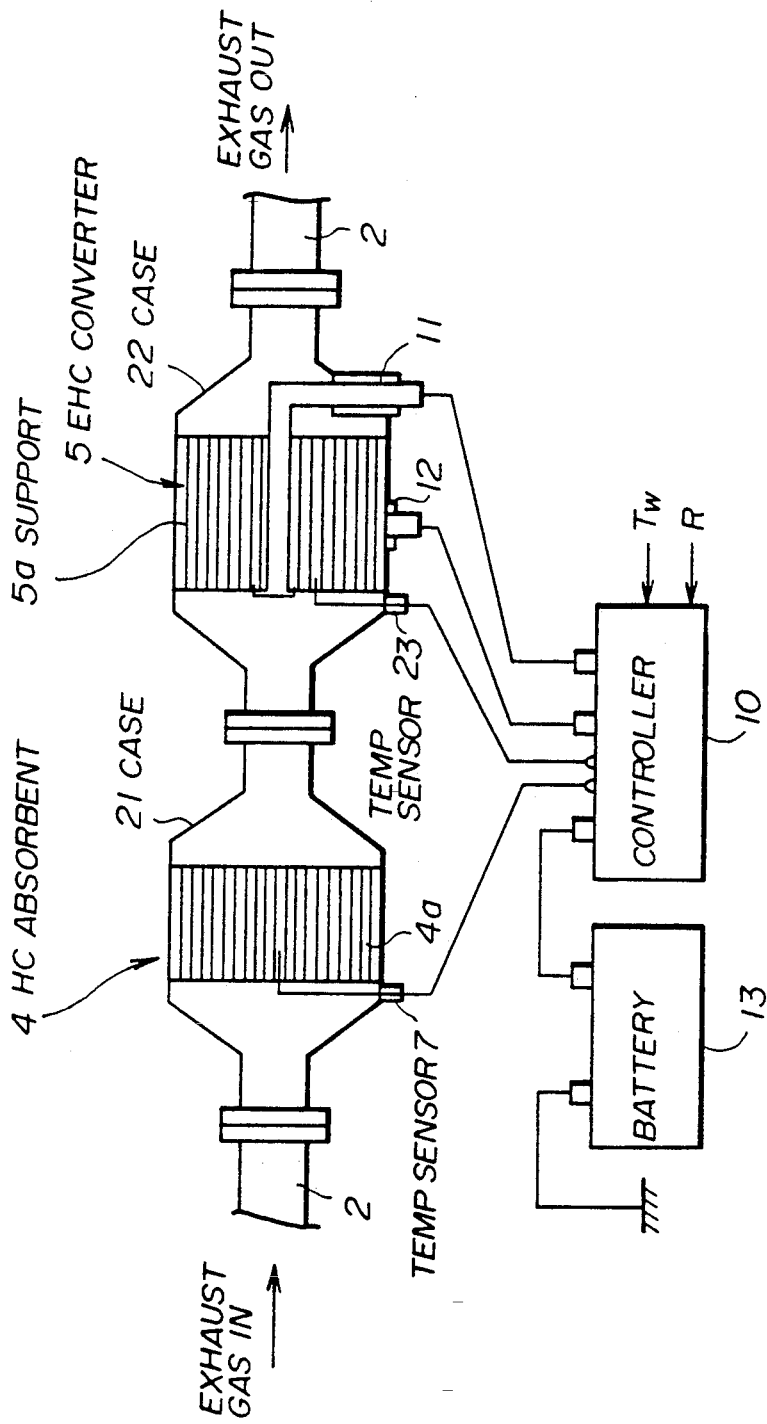
FIG. 4 is a diagram showing a modification of the exhaust emission control apparatus shown in FIG. 1.

FIG. 4 shows a modification of the exhaust emission control apparatus shown in FIG. 1. In FIG. 4, the parts of a modified exhaust emission control apparatus which are the same as the corresponding parts of the apparatus shown in FIG. 1 are designated by the same reference numerals, and a description thereof will be omitted. The exhaust emission control apparatus 20 shown in FIG. 4 has two converter cases 21 and 22 which are connected in series. The HC absorbent 4 is accommodated in the converter case 21 at the upstream portion of the exhaust passage 2, and the EHC converter 5 having the electrically heatable metallic support 5a is accommodated in the converter case 22 at the downstream portion of the exhaust passage 2.

In the apparatus shown in FIG. 4, in addition to the temperature sensor 7 provided at the HC absorbent 4, a second temperature sensor 23 is provided at the EHC converter 5 to detect an EHC converter temperature Tc. The second temperature sensor 23 is connected to the controller 10, and a signal indicating the EHC converter temperature Tc is output by the sensor 23 to the controller 10. In the modified apparatus shown in FIG. 4, the HC absorbent 4 and the EHC converter 5 are separately accommodated in the cases 21 and 22, which is especially convenient when parts have to be exchanged or maintenance work on either of the cases is needed.

Figure 5:
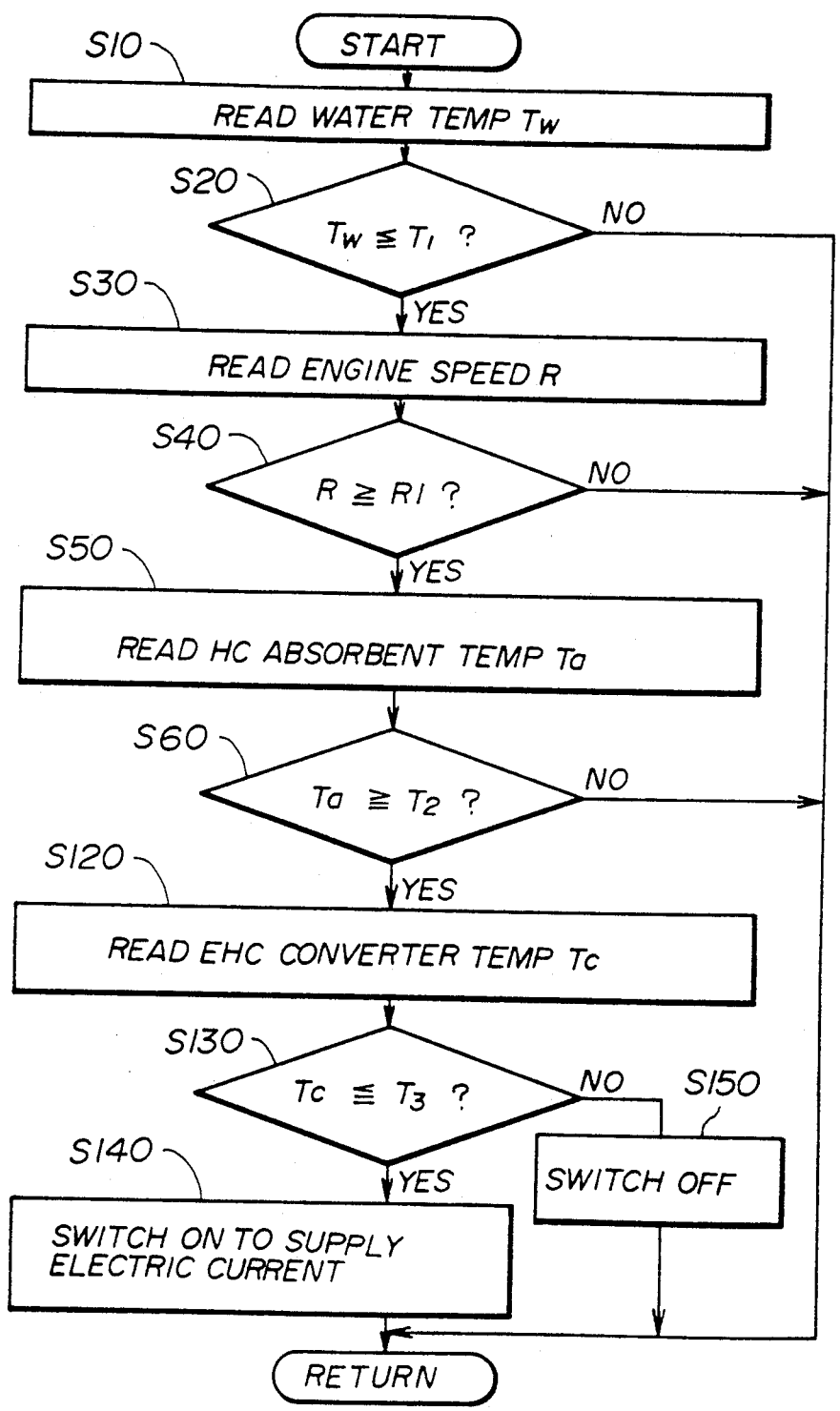
FIG. 5 is a flow chart for explaining a modified EHC converter heating process performed by the exhaust emission control apparatus shown in FIG. 4.

FIG. 5 shows an EHC converter heating process performed by the exhaust emission control apparatus shown in FIG. 4. In FIG. 5, steps S10 through S40 determine whether or not the engine is in a starting condition, and steps S50 and S60 determine whether or not the HC absorbent temperature Ta is higher than the predetermined temperature T2. If the determinations are affirmative (Tw≦T1, R≧R1, and Ta≧T2), step S120 reads an EHC converter temperature Tc indicated by the output signal of the sensor 23. Step S130 detects whether or not the EHC converter temperature Tc is below a predetermined temperature T3. This temperature T3 is preset to, for example, 350 deg C., which is higher than the activation temperature.

If it is detected in step S130 that the EHC converter temperature Tc is lower than the temperature T3, step S140 switches on the terminal of the controller 10 to start supplying electric current to the EHC converter 5. Conversely, if the temperature Tc is higher than the temperature T3, step S150 switches off the terminal to stop supplying electric current to the EHC converter 5 due to the catalyst of the EHC converter 5 already being activated. In the embodiment shown in FIGS. 4 and 5, the temperature sensor 23 is arranged at the EHC converter 5 and the EHC converter temperature Tc is directly measured by using the output signal of the temperature sensor 23. Thus, by performing the EHC converter heating process, it is possible to reliably prevent the hydrocarbon in the exhaust gas (desorbed from the HC absorbent at a temperature higher than the desorption temperature) from being emitted to the atmosphere in an unpurified state.

Figure 6:
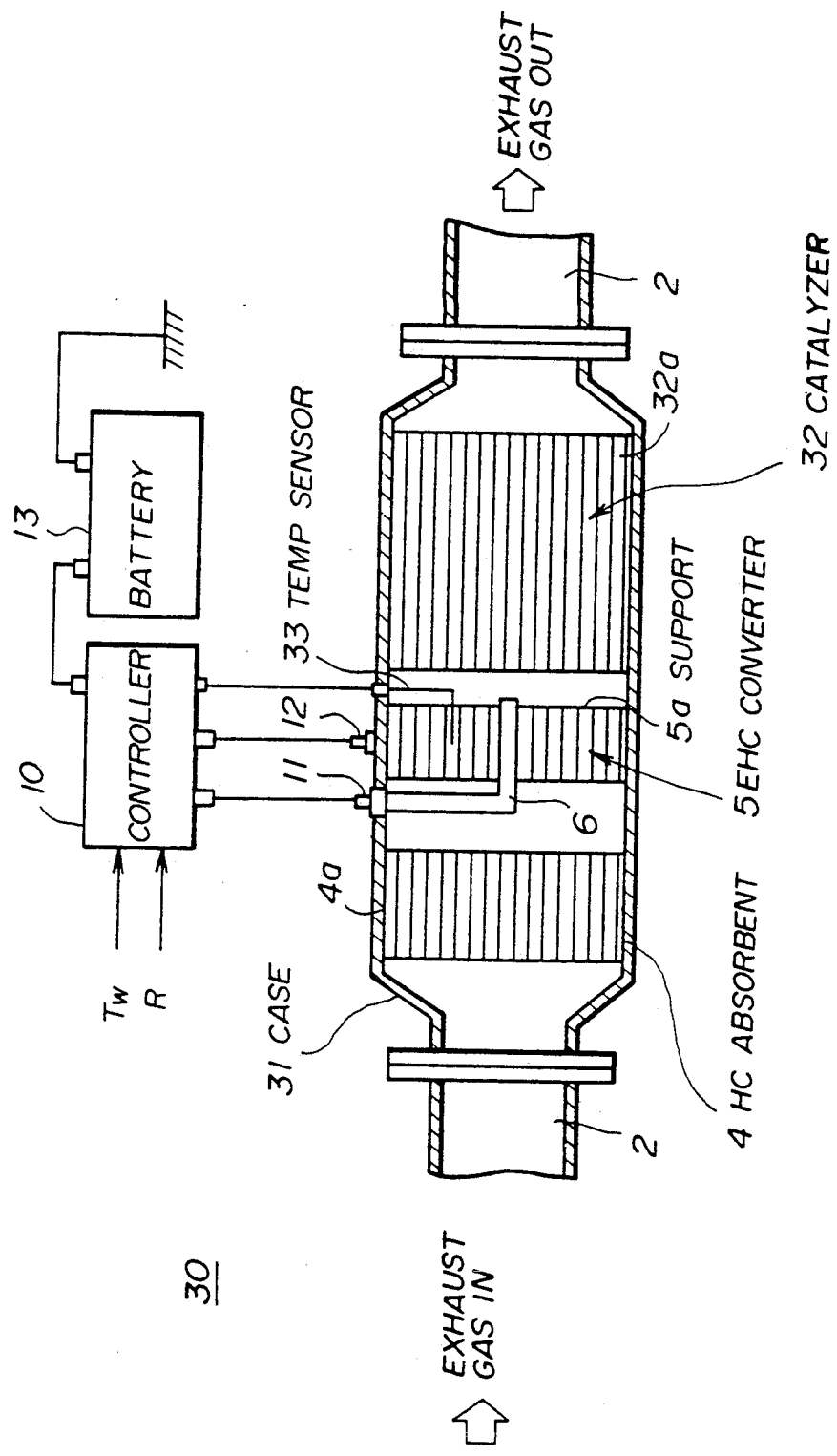
FIG. 6 is a diagram showing another modification of the exhaust emission control apparatus shown in FIG. 1.

FIG. 6 shows another modification of the exhaust emission control apparatus shown in FIG. 1. In FIG. 6, the parts which are the same as those corresponding parts of the apparatus shown in FIG. 1 are designated by the same reference numerals, and a description thereof will be omitted. The exhaust emission control apparatus 30 shown in FIG. 6 has a converter case 31 in which the HC absorbent 4 and the EHC converter 5 connected together in series are accommodated. In the converter case 31, a catalyzer 32 is arranged at a downstream portion of the EHC converter 5. Similarly to the EHC converter 5, the catalyzer 32 is formed from an electrically heatable metallic support 32a. This metallic support 32a is formed by winding a ferritic stainless steel foil on a core electrode. The metallic support 32a is coated with alumina, and catalyst substances such as platinum Pt, palladium Pd, and rhodium Rh are fixed on the alumina-coated metallic support 5a, and thus the catalyzer 32 is formed.

In this embodiment shown in FIG. 6, the catalyzer 32 is additionally placed at the downstream portion of the EHC converter 5. Even when a certain amount of hydrocarbon in exhaust gas is passed through the EHC converter 5, such hydrocarbon is fed into the catalyzer 32 and the purification thereof is performed so as to prevent the hydrocarbon in the exhaust gas from being emitted to the atmosphere in an unpurified state. For this reason, the capacity of the EHC converter 5 can be reduced, and it is possible to decrease the thermal capacity of the metallic support 5a without changing the converter heating effect of the EHC converter 5. Therefore, in this embodiment, the on-time period required to increase the EHC converter temperature to the activation temperature or higher can be shortened, a desired level of exhaust emission control can be achieved when the engine is in a starting condition, and the amount of electric power required to heat the EHC converter 5 can be reduced.

In the exhaust emission control apparatus shown in FIG. 6, a temperature sensor 33 is provided at the EHC converter 5 to detect an EHC converter temperature Tc, this temperature sensor 33 being used instead of the temperature sensor 7 provided at the HC absorbent 4 of the apparatus shown in FIG. 1. The temperature sensor 33 is connected to the controller 10, and a signal indicating the EHC converter temperature Tc is output by the temperature sensor 33 to the controller 10. Therefore, the output signal of the water temperature sensor indicating the engine cooling water temperature Tw, the output signal of the distributor indicating the engine speed R, and the output signal of the temperature sensor 33 indicating the EHC converter temperature Tc are supplied to the controller 10. In accordance with the received signals, the controller 10 controls the electric power supplied to the core electrode 6 of the EHC converter 5.

Figure 7:
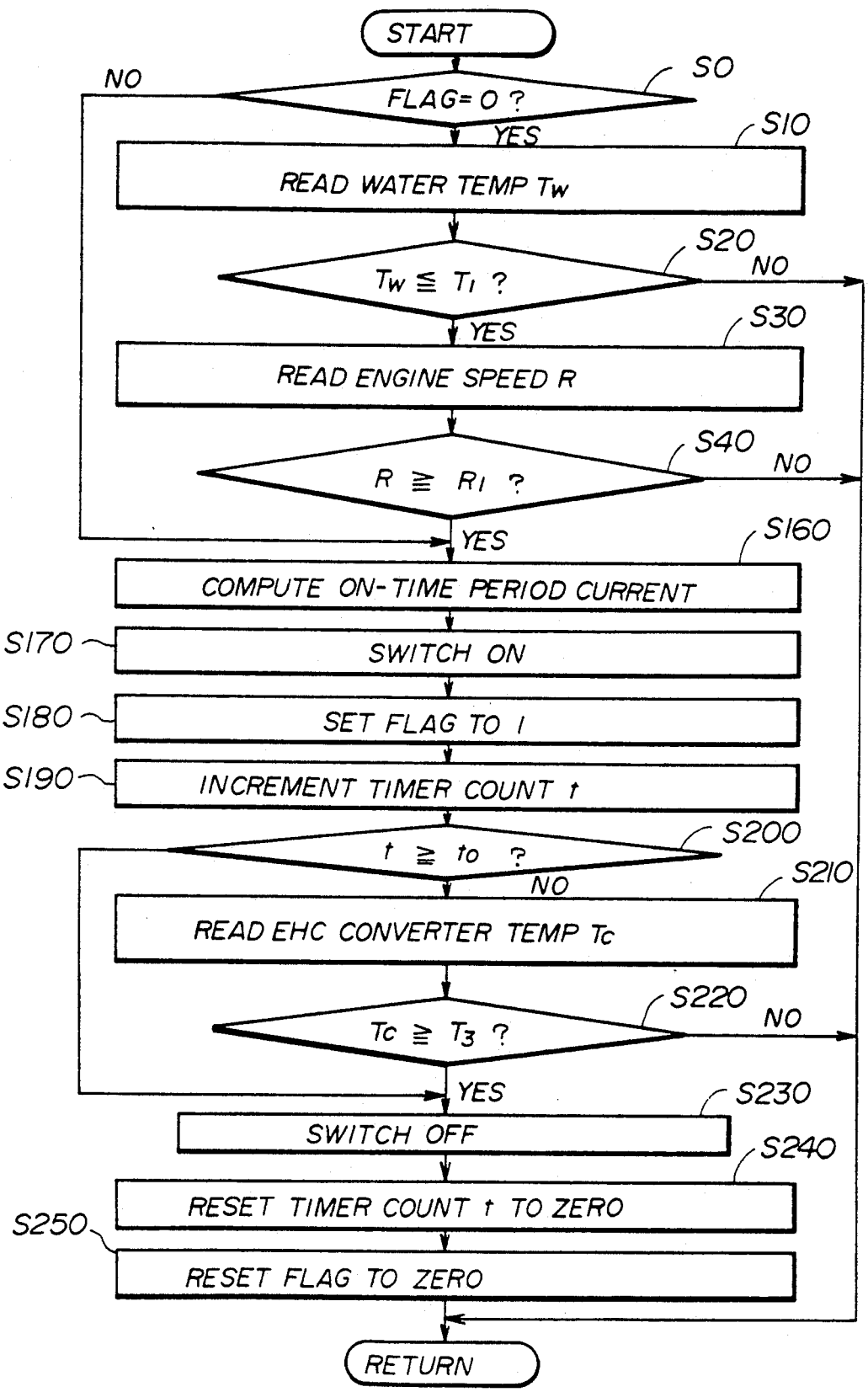
FIG. 7 is a flow chart for explaining a modified EHC converter heating process performed by the exhaust emission control apparatus shown in FIG. 6.

FIG. 7 shows an EHC converter heating process performed by the exhaust emission control apparatus 30 shown in FIG. 6. This process is repeatedly commenced at prescribed time intervals. In the flow chart shown in FIG. 7, step S0 detects whether or not an on-time flag is set to zero. The on-time flag is set to "1" once electric current is supplied to the electrode 6 of the EHC converter 5, whereas, if electric current is not yet supplied to the electrode 6 or if the supplying of the electric current is finished, the on-time flag is set to "0".

Similarly to the previously described embodiment, in steps S10 through S40 of the flow chart shown in FIG. 7, it is determined whether or not the engine is in a starting condition. If the answer is negative, the process immediately ends without the subsequent steps being performed. If the answer is affirmative (Tw≦T1, R≧R1), step S160 computes an electric current which must be supplied to the core electrode 6 so as to heat the EHC converter 5 to a high temperature. Step S170 starts supplying electric current (in accordance with the computation in step S160) to the core electrode 6 by switching on the terminal of the controller 10. The amount of the electric current supplied is determined in step S160 in accordance with the engine cooling water temperature and the other operating conditions, so as to allow the temperature of the EHC converter 5 to be increased to the activation temperature when the HC absorbent 4 reaches the desorption temperature.

Step S180 sets the flag to "1", this flag indicating the condition of the core electrode 6 to which the electric current is supplied. When the subsequent converter heating process is performed with the flag being set to "1", the steps S160 through S190 are immediately performed without the steps S10 through S40 being performed if the answer to the step S0 is negative.

Step S190 increments the number of output pulses of an on-time timer, the number of the output pulses indicating the on-time period t during which electric current is continuously supplied to the electrode 6 of the EHC converter 5. Step S200 detects whether or not the on-time period t (indicated by the number of the output pulses of the on-time timer in step S190) exceeds a predetermined time period t0. The controller 10 continuously supplies electric current to the electrode 6 until the temperature of the EHC converter is increased to an appropriate temperature (or until the on-time period t exceeds the predetermined period t0).

If step S200 detects that the on-time period t still does not exceed the time period t0, step S210 reads an EHC converter temperature Tc indicated by the output signal of the temperature sensor 33. Step S220 detects whether or not the EHC converter temperature Tc is higher than a predetermined temperature T3. This temperature T3 is preset to an upper limit (for example, 400 deg C.) of the activation range in which the catalyst of the EHC converter 5 is active. In step S220, it is checked whether or not the catalyst of the EHC converter 5 is heated to a temperature higher than the activation range. If the EHC converter temperature Tc is not higher than the temperature T3 in step S220, the EHC converter heating process shown in FIG. 7 ends, but the electric current is continuously supplied to the core electrode 6. The above mentioned steps S0 and S160-S220 are repeatedly performed until the answer to either step S200 or step S220 is affirmative.

When step S200 detects that the on-time period t exceeds the predetermined period t0, or when step S220 detects that the EHC converter temperature Tc is higher than the predetermined temperature T3, step S230 stops supplying electric current to the electrode 6 by switching off the terminal of the controller 10. Step S240 resets the on-time period t indicated by the number of the output pulses of the on-time timer to zero. Step S250 resets the on-time flag to zero and the EHC converter heating process ends. The controller 10 does not supply electric current to the electrode 6 until it is determined in the following process that the engine is again in the starting condition.

In the exhaust emission control apparatus shown in FIG. 6, the supplying of electric current to the electrode 6 is stopped immediately when the EHC converter 5 reaches the activation temperature. The EHC converter temperature Tc is detected by the temperature sensor 33, and the supplying of electric current to the electrode 6 is controlled by the controller in accordance with the detected EHC converter temperature.

The catalyzer 32 is additionally provided at the downstream portion of the EHC converter 5. Thus, it is possible to safely reduce the amount of unnecessary electric power supplied to the EHC converter even when the time period t0 is preset to a relatively great value. Also, it is possible to prevent the EHC converter 5 from being overheated.

Next, a description will be given of a test result of the exhaust emission control apparatus 30 according to the present invention when an emission test (U S., L.A. #4 mode, colt transient test) was conducted with the exhaust emission control apparatus 30 as shown in FIG. 6. In order to conduct the emission test mentioned above, the apparatus 30 was connected to an engine having a displacement of about 2,200 cc via a three-way catalytic converter at the upstream portion of the apparatus in the exhaust passage of the engine.

The HC absorbent 4 used in the apparatus 30 was formed from a zeolite-coated metallic support of 400 cm$^3$. The EHC converter 5 used was formed from an alumina-coated metallic support of 100 cm$^3$ on which platinum Pt and palladium Pd were fixed as the catalyst substances, the metallic support being wound on the core electrode 6. The catalyzer 32 used in the apparatus 30 was formed from an alumina-coated metallic support of 700 cm$^3$ which support was formed in a manner similar to that of the EHC converter 5.

The results of the emission test conducted with the apparatus 30 having the specifications mentioned above were as follows: the HC purification rate was approximately 97% when the EHC converter heating process was performed in accordance with the flow chart shown in FIG. 7. In contrast, the HC purification rate when no EHC converter heating process was performed was approximately 92%. Thus, according to the exhaust emission control apparatus of the present invention, a better HC purification rate can be achieved and the amount of HC in the exhaust gas emitted to the atmosphere can remarkably be reduced.

In the above described embodiments, the metallic supports formed from ferritic stainless steel foils are used for the HC absorbent 4, the EHC converter 5 and the catalyzer 32. However, the present invention is not limited to these embodiments. For example, a ceramic support containing codierite as the main component thereof, or other types of supports can be used for the HC absorbent 4, the EHC converter 5 and the catalyzer 32. As described above, according to the present invention, the EHC converter temperature can be increased to the activation temperature via the EHC converter heating process, so that the catalyst of the EHC converter is activated when the HC absorbent temperature is higher than the desorption temperature. Hence, it is possible to efficiently and reliably prevent the hydrocarbon in the exhaust gas (desorbed from the HC absorbent at a temperature above the desorption temperature) from being emitted to the atmosphere in an unpurified state.

Figure 8:
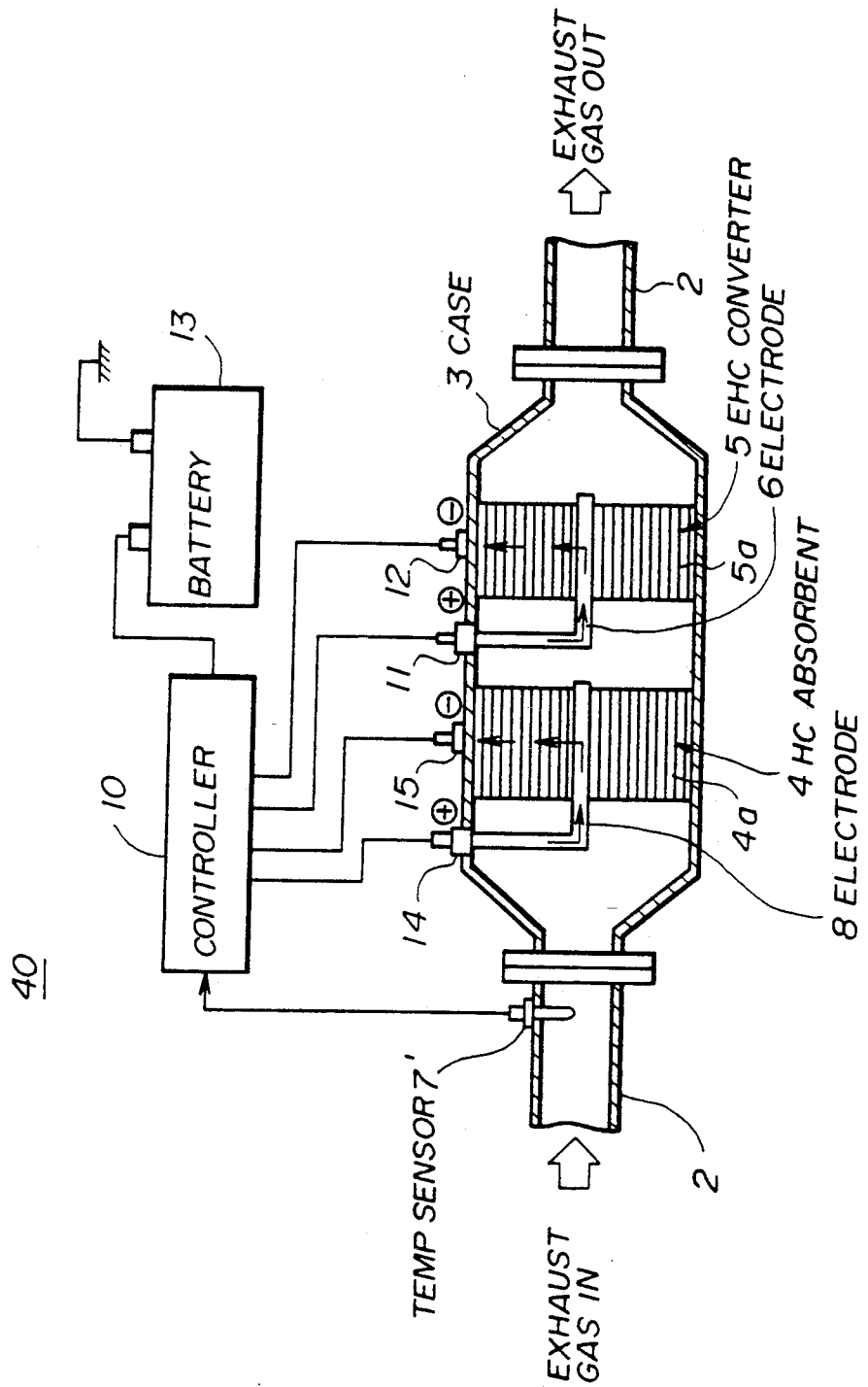
FIG. 8 is a diagram showing a second embodiment of the exhaust emission control apparatus according to the present invention.

Next, a description will be given of a second embodiment of the present invention, with reference to FIG. 8. FIG. 8 shows an exhaust emission control apparatus 40 of the second embodiment of the present invention. In FIG. 8, the parts of the apparatus 40 which are essentially the same as the corresponding parts shown in FIG. 1 are designated by the same reference numerals, a description thereof being omitted.

The HC absorbent 4 of the exhaust emission control apparatus 40 shown in FIG. 8 is made of an electrically heatable metallic support 4a with a honeycomb structure, this metallic support 4a being formed of a ferritic stainless steel foil having a high-temperature corrosion resistance. The metallic support 4a is coated with a porous absorbing material such as zeolite, silica, alumina or the like which is suitable as the hydrocarbon absorbing substance. At a portion of the exhaust passage 2 at an upstream portion of the converter case 3, a temperature sensor 7' is provided to detect a temperature Ta of the HC absorbent 4. The temperature sensor 7' measures a temperature of exhaust gas flowing in the exhaust passage 2 as the HC absorbent temperature Ta, and a signal indicating the detected HC absorbent temperature Ta is output by the temperature sensor 7' to the controller 10.

The HC absorbent 4 shown in FIG. 8 is provided in the center thereof with a core electrode 8. This electrode 8 is connected to a positive terminal 14 on the converter case 3, while the positive terminal is connected to the controller 10. The HC absorbent 4 is also provided with the electrically heatable metallic support 4a. The metallic support 4a is connected to a negative terminal 15 on the converter case 3, while the negative terminal 15 is connected to the controller 10. Therefore, by applying voltage generated by the battery 13 to the terminals 14 and 15 by means of the controller 10, the metallic support 4a of the HC absorbent 4 can be heated, so that the HC absorbent temperature will be controlled by the controller 10.

Similar to the apparatus shown in FIG. 1, the EHC converter 5 shown in FIG. 8 includes the electrically heatable metallic support 5a connected to the negative terminal 12, and also includes the core electrode 6 connected to the positive terminal 11. The positive and negative terminals 11 and 12 are connected to the controller 10. Therefore, by applying voltage generated by the battery 13 to the terminals 11 and 12 by means of the controller 10, the metallic support 5a of the EHC converter 5 can be heated, so that the EHC converter temperature will be controlled by the controller 10.

A signal indicating the HC absorbent temperature Ta output by the temperature sensor 7 and signals indicating parameters X of engine idling conditions are supplied to the controller 10. The signals indicating the parameters X of the engine idling conditions are, for example, a water temperature signal indicating an engine cooling water temperature Tw output by a water temperature sensor mounted on the engine, an intake air condition signal indicating an oxygen concentration of intake air output by an oxygen sensor, and an engine speed signal indicating an engine rotating speed R output by a distributor. In accordance with the output signals of the sensors mentioned above, the controller 10 performs an EHC converter heating process according to the present invention, which will be described below.

Next, a description will be given of an EHC converter heating process performed by the exhaust emission control apparatus shown in FIG. 8, with reference to FIGS. 9A and 9B. This EHC converter heating process shown in FIGS. 9A and 9B is repeatedly commenced by the controller 10 of the exhaust emission control apparatus at time intervals of, for example, 4 milliseconds.

Figure 9A:
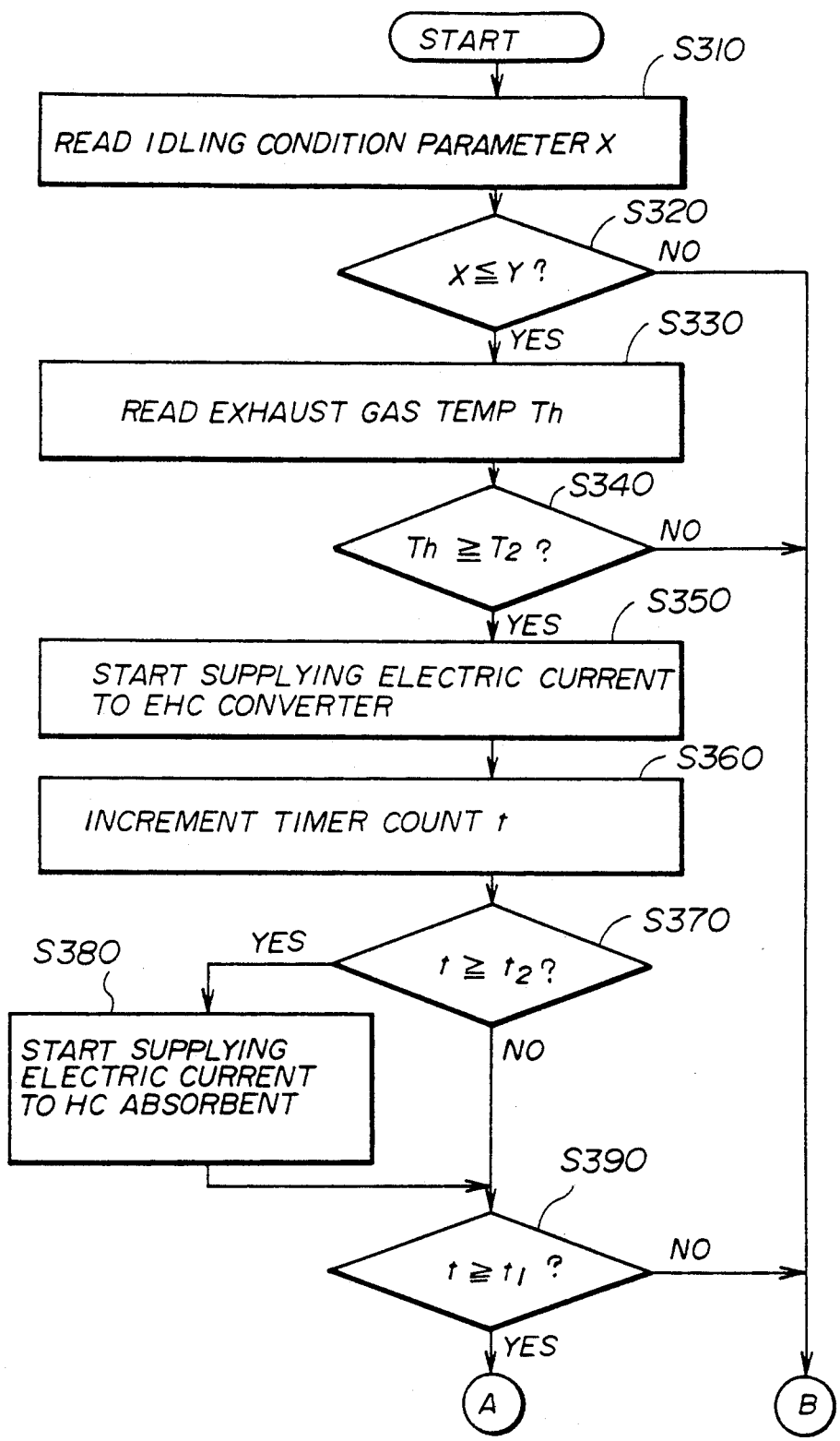
FIGS. 9A and 9B are a flow chart for explaining an EHC converter heating process performed by the exhaust emission control apparatus shown in FIG. 8.
Figure 9B:
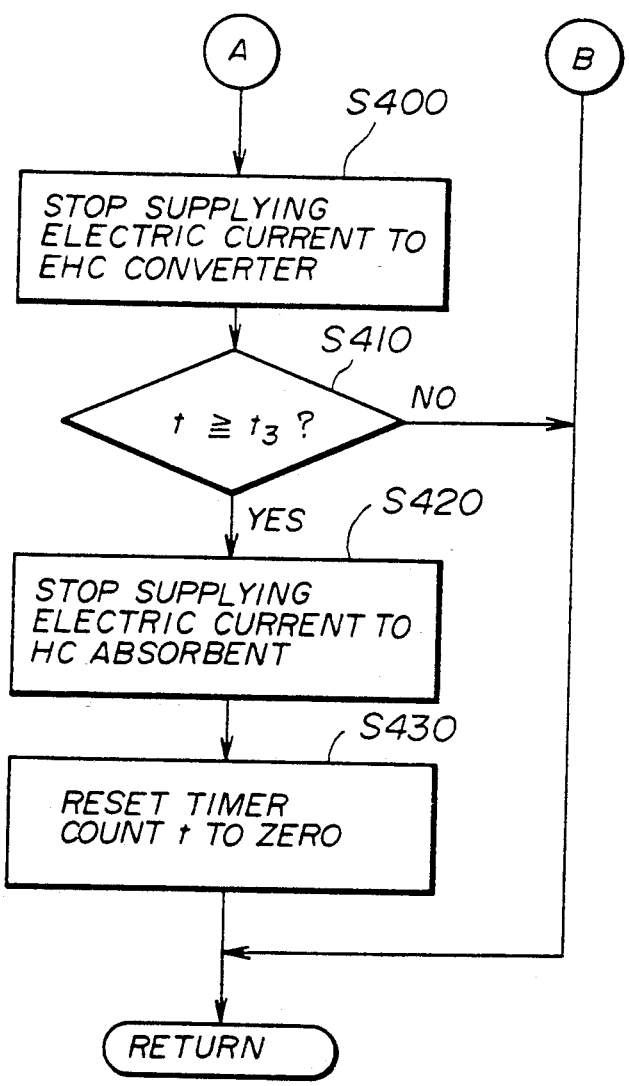

When the EHC converter heating process is commenced, step S310, shown in FIG. 9A, reads engine idling condition parameters X respectively indicated by the output signals of the above sensors mounted on the engine, by means of the controller 10. Step S320 detects whether or not each of the parameters X is lower than a predetermined value Y indicating the end of a corresponding engine idling condition. If step S320 detects that any of the parameters X are higher than the predetermined value Y, the engine is put completely in the idling condition and the EHC converter heating process is not performed. If it is detected that any of the parameters X are lower than the predetermined value Y, the engine is not put in the idling condition and subsequent step S330 is performed.

In the above steps S310 and S320, it is determined whether or not the engine is still cold and in the course of the idling. When the engine is in such a condition, it is necessary to absorb hydrocarbon in exhaust gas by means of the HC absorbent 4 since the catalyst of the EHC converter 5 has not yet been activated. Conversely, when the engine is in a stable running condition, the catalyst of the EHC converter 5 is already activated. Thus, in such a case, the EHC converter heating process immediately ends without the steps S330 through S430 being performed.

Step S330 reads an exhaust gas temperature Th indicated by the output signal of the temperature sensor 7'. This exhaust gas temperature Th is substantially the same as the HC absorbent temperature Ta. Step S340 detects whether or not the exhaust gas temperature Th is higher than a predetermined temperature T2. The temperature T2 is preset to an appropriate temperature (for example, 150±30 deg C.) which is lower than the desorption temperature (200 deg C.) of the HC absorbent 4. In the EHC converter heating process according to the present invention, when the exhaust gas temperature Th (or the HC absorbent temperature Ta) reaches the predetermined temperature T2, the controller 10 starts supplying electric current to the EHC converter 5 so as to heat the catalyst of the EHC converter 5.

If step S340 detects that the exhaust gas temperature Th is higher than the temperature T2, step S350 starts supplying electric current to the metallic support 5a of the EHC converter 5. Immediately after the supplying of electric current to the metallic support 5a of the EHC converter 5 is started, step S360 increments the number of output pulses of an on-time timer by means of the controller 10. The number of the output pulses of the on-time timer indicates the on-time period t during which electric current is continuously supplied to the EHC converter 5.

Step S370 detects whether or not the on-time period t indicated by the number of the output pulses in step S360 is greater than a predetermined time period t2. If the on-time period t indicated by the number of the output pulses exceeds the time period t2, step S380 starts supplying electric current to the metallic support 4a of the HC absorbent 4. Thus, when the predetermined time period t2 has elapsed after the supplying of electric current to the EHC converter 5 has started, the supplying of electric current to the HC absorbent 4 is started, so that the HC absorbent 4 is heated to a high temperature which is roughly between 400 deg C. and 500 deg C. At such a temperature, the absorbed hydrocarbon HC is completely desorbed from the HC absorbent 4, and the desorbed hydrocarbon HC can be purified by the active catalyst of the EHC converter 5 which is heated by the metallic support 5a. Therefore, it is possible to prevent the hydrocarbon in the exhaust gas from being emitted to the atmosphere in an unpurified state. The limited capacity of the HC absorbent 4 to absorb hydrocarbon can be increased by performing the above mentioned HC absorbent heating step (step S380).

Step S390 detects whether or not the on-time period t indicated by the number of the output pulses of the on-time timer is greater than a predetermined time period t1. This time period t1 is preset to, for example, 10±5 seconds, which is the time period required for heating the EHC converter 5 to the activation temperature after the supplying of electric current to the metallic support 5a is started. Therefore, when the predetermined time period t2 has elapsed, the EHC converter temperature is increased to the activation temperature and the EHC converter 5 is activated.

Thus, if it is detected in step S390 that the on-time period t exceeds the predetermined time period t2, step S400 shown in FIG. 9B stops supplying electric current to the metallic support 5a by switching off the terminal of the controller 10.

Step S410 detects whether or not the on-time period t is greater than a predetermined time period t3. This time period t3 is preset to an appropriate time period required for heating the HC absorbent 4 to a temperature higher than the desorption temperature, so that the absorbed hydrocarbon is completely desorbed from the HC absorbent 4. If it is detected in step S410 that the on-time period t is greater than the predetermined time period t3, step S420 stops supplying electric current to the metallic support 4a of the EHC converter 4. Step S430 resets the on-time period t indicated by the number of the output pulses of the on-period timer to zero.

Figure 10:
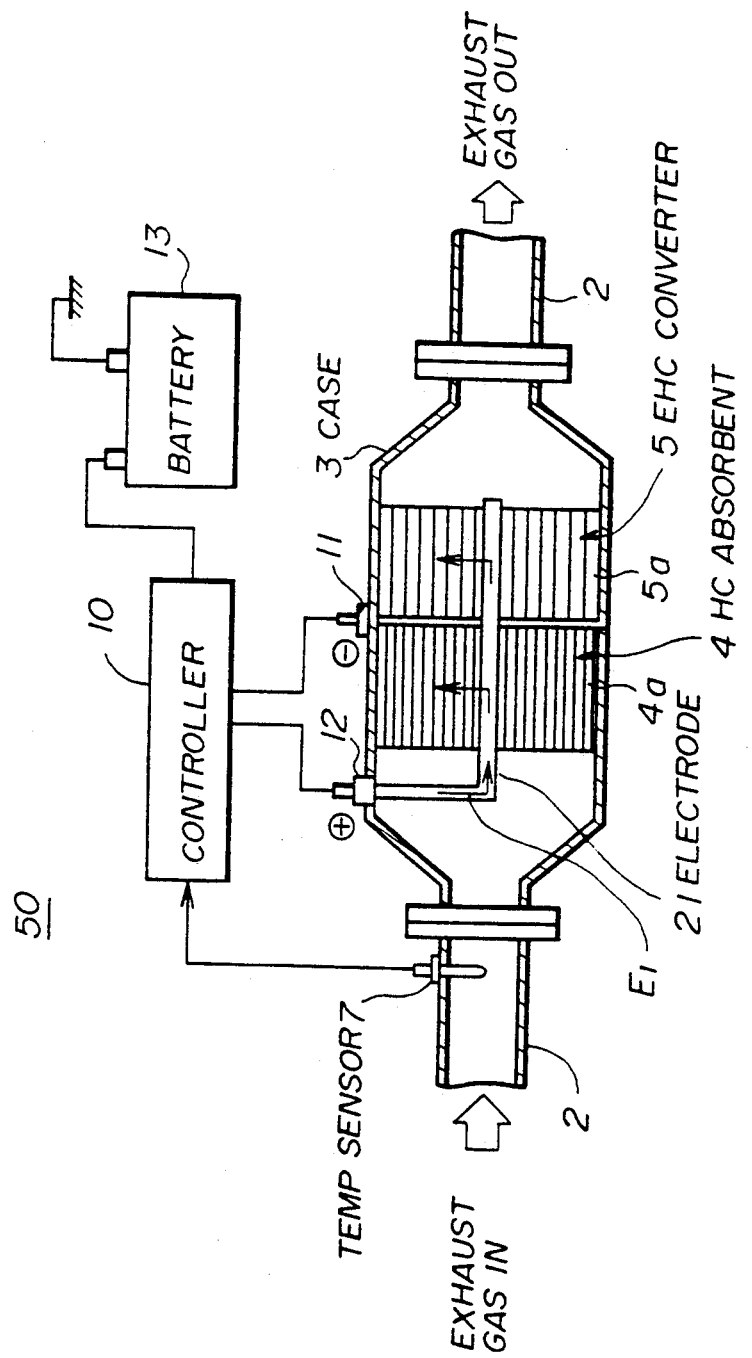
FIG. 10 is a diagram showing a modification of the exhaust emission control apparatus shown in FIG. 8.

FIG. 10 shows a modification of the exhaust emission control apparatus. FIG. 11 shows another modification of the exhaust emission control apparatus. In a modified apparatus 50 shown in FIG. 10 and another modified apparatus 60 shown in FIG. 11, the parts which are the same as the corresponding parts of the apparatus shown in FIG. 8 are designated by the same reference numerals, and a description thereof will be omitted. In the exhaust emission control apparatus 50 shown in FIG. 10, a common electrode 21 is connected to both the HC absorbent 4 and the EHC converter 5. One end of the electrode 21 is connected to the positive terminal 12, the positive terminal 12 being coupled to the controller 10. The metallic support 4a of the HC absorbent 4 and the metallic support 5a of the EHC converter 5 are connected in parallel to the negative terminal 11, the terminal 11 being coupled to the controller 10. The metallic support 5a of the EHC converter 5 has a number of cells smaller than that of the metallic support 4a of the HC absorbent 4, and the electric resistance and thermal capacity of the metallic support 5a are made relatively small. The electric current from the battery 13 goes through the electrode 21 in a direction indicated by an arrow E1 in FIG. 10. In the case of the above described apparatus 50, it is possible to heat the EHC converter 5 to the activation temperature before the HC absorbent 4 is heated to the desorption temperature, even if no EHC converter heating process is performed.

In the exhaust emission control apparatus 60 shown in FIG. 11, the two electrodes 6 and 8 are used. The metallic support 4a of the HC absorbent 4 and the metallic support 5a of the EHC converter 5 are connected in parallel, and the metallic support 5a has an electric resistance which is greater than that of the metallic support 4a. The electric current from the battery 13 goes through the electrodes 6 and 8 in a direction indicated by an arrow E2 in FIG. 11. It is also possible to heat the EHC converter 5 to the activation temperature before the HC absorbent 4 is heated to the desorption temperature, even if no EHC converter heating process is performed.

As described above, according to the present invention, it is possible to prevent the hydrocarbon (which is desorbed from the HC absorbent whose temperature is higher than the desorption temperature) from being emitted to the atmosphere in an unpurified state. The desorbed hydrocarbon at such a temperature is purified by the active catalyst of the EHC converter because the electric current is supplied to the electrically heatable metallic support of the EHC converter when the HC absorbent reaches the desorption temperature.

Further, the present invention is not limited to the above described embodiments, and variations and modifications may be made without departing from the scope of the present invention.

What is claimed is:

1. An exhaust emission control apparatus for use in an internal combustion engine, said apparatus comprising:
an exhaust passage of an internal combustion engine, said exhaust passage having an upstream portion and a downstream portion, wherein exhaust gas in the exhaust passage travels from said upstream portion of said passage to said downstream portion of said exhaust passage;
an absorbent provided in said upstream portion of said exhaust passage to absorb hydrocarbon in exhaust gas passing through the exhaust passage at a temperature lower than a first temperature, the hydrocarbon being desorbed from the absorbent at a temperature higher than said first temperature;
a catalystic converter having a catalyst provided in said downstream portion of said exhaust passage to purify hydrocarbon in the exhaust gas when said catalyst of said catalytic converter is activated at a temperature higher than a second temperature, wherein said second temperature is higher than said first temperature; and
heating means for heating said catalytic converter to a temperature higher than said second temperature when the temperature of the absorbent becomes higher than said first temperature, wherein said heating means includes a controller which supplies electric current to said heater means when the temperature of the absorbent becomes higher than said first temperature so that the hydrocarbon desorbed from the absorbent in said exhaust passage is purified by the activated catalyst of the catalytic converter.

2. An exhaust emission control apparatus according to claim 1, wherein said heating means includes an electrically heatable metallic support provided on said catalystic converter, wherein said controller supplies electric current to said electrically heatable metallic support when the temperature of the absorbent becomes higher than said first temperature so that said catalytic converter is heated by said controller of said heating means using said metallic support to a temperature higher than said second temperature.

3. An exhaust emission control apparatus according to claim 1, further comprising a temperature sensor for detecting a temperature of said absorbent, wherein said catalytic converter is continuously heated by said heating means until a preselected time period has elapsed since the absorbent temperature detected by said temperature sensor exceeds said first temperature.

4. An exhaust emission control apparatus according to claim 1, wherein said heating means includes a first sensor for detecting a temperature of said absorbent, an electrically heatable metallic support provided on said catalytic converter, a second sensor for detecting a temperature of said catalytic converter, and, wherein said controller supplies electric current to said metallic support in accordance with an absorbent temperature detected by said first sensor and a catalytic converter temperature detected by said second sensor.

5. An exhaust emission control apparatus according to claim 1, further comprising a catalyzer provided at a downstream portion of said catalytic converter in said exhaust passage in order to purify hydrocarbon in the exhaust gas when said hydrocarbon passes through said catalytic converter at a temperature lower than said second temperature.

6. An exhaust emission control apparatus according to claim 1, wherein said heating means comprises, a first heater for electrically heating said catalytic converter, and a temperature sensor for detecting a temperature of said absorbent, so that said catalytic converter is heated by said controller using said first heater to a temperature corresponding to a temperature of said absorbent detected by said temperature sensor, and wherein said apparatus further comprises a second heater for electrically heating said absorbent, so that said absorbent is heated by said controller using said second heater.

7. An exhaust emission control apparatus according to claim 6, wherein said second heater comprises an electrically heatable metallic support provided on said absorbent, so that said controller starts supplying electric current to said metallic support of said absorbent when a preselected time period has elapsed since the absorbent temperature detected by said temperature sensor exceeds the first temperature, and said controller continuously supplies electric current to said metallic support for a preselected time period.

8. An exhaust emission control apparatus according to claim 6, wherein said first heater comprises an electrically heatable metallic support provided on said catalytic converter, so that said controller continuously supplies electric current to said metallic support of said catalytic converter until a preselected time period has elapsed since the absorbent temperature detected by said temperature sensor exceeds the first temperature.

* * * * *

UNITED STATES PATENT AND TRADEMARK OFFICE
CERTIFICATE OF CORRECTION

PATENT NO. : 5,271,906
DATED : December 21, 1993
INVENTOR(S) : Kiyoshi YUUKI, et al.

It is certified that error appears in the above-indentified patent and that said Letters Patent is hereby corrected as shown below:

Column 6, line 56, between "to" and "incre-" insert --the metallic support 5A is started in step S70, step S80--.

Column 6, line 64, change "10+5" to --10±5--.

Column 7, line 33, between "is" and "to" insert --emitted--.

Column 11, line 39, change "remarkably be reduced." to --be reduced remarkably.--.

Signed and Sealed this

Twenty-seventh Day of February, 1996

Attest:

BRUCE LEHMAN

Attesting Officer        Commissioner of Patents and Trademarks